United States Patent
Alberth, Jr. et al.

(10) Patent No.: US 9,116,567 B2
(45) Date of Patent: Aug. 25, 2015

(54) SYSTEMS AND METHODS FOR MANAGING THE DISPLAY OF CONTENT ON AN ELECTRONIC DEVICE

(75) Inventors: William P. Alberth, Jr., Prairie Grove, IL (US); Dean E. Thorson, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 530 days.

(21) Appl. No.: 13/455,930

(22) Filed: Apr. 25, 2012

(65) Prior Publication Data

US 2013/0285922 A1    Oct. 31, 2013

(51) Int. Cl.
G06F 3/041 (2006.01)
G06F 3/0488 (2013.01)
G06F 1/16 (2006.01)
G06F 3/01 (2006.01)
G09G 3/00 (2006.01)

(52) U.S. Cl.
CPC ............ *G06F 3/0412* (2013.01); *G06F 1/1626* (2013.01); *G06F 1/1652* (2013.01); *G06F 1/1694* (2013.01); *G06F 3/017* (2013.01); *G06F 3/0488* (2013.01); *G06F 3/04883* (2013.01); *G06F 2203/04102* (2013.01); *G09G 3/001* (2013.01); *G09G 2380/02* (2013.01)

(58) Field of Classification Search
CPC ....... G06F 1/1652; G06F 3/044; G06F 3/045; G06F 3/0412; G06F 2203/04102; G06F 1/1643; G06F 3/0488; G02F 1/13338; G02F 1/13305
USPC .................................. 345/173, 18.01–19.03
See application file for complete search history.

(56) References Cited

U.S. PATENT DOCUMENTS

| | | | |
|---|---|---|---|
| 5,931,764 A | 8/1999 | Freeman et al. |
| 5,956,020 A | 9/1999 | D'Amico et al. |
| 6,243,075 B1 | 6/2001 | Fishkin et al. |
| 7,479,949 B2 | 1/2009 | Jobs et al. |
| 2003/0160735 A1 | 8/2003 | Lee et al. |
| 2004/0041800 A1 | 3/2004 | Daniels |

(Continued)

FOREIGN PATENT DOCUMENTS

| | | |
|---|---|---|
| JP | 2005018492 A | 1/2005 |
| WO | 0079766 A1 | 12/2000 |
| WO | 2012040363 A1 | 3/2012 |

OTHER PUBLICATIONS

United States Patent and Trademark Office, "Final Rejection" for U.S. Appl. No. 11/752,828, Nov. 13, 2012, 12 pages.

(Continued)

*Primary Examiner* — Priyank Shah
(74) *Attorney, Agent, or Firm* — Morris & Kamlay LLP

(57) ABSTRACT

Systems and methods are provided for managing the display of content on an electronic rollable device (600). According to certain aspects, the systems and methods facilitate communications and applications of a rollable device with a display screen interface. The device detects an interaction with the display screen interface by a user (605), such as the user grasping the device. From the interaction, the device identifies a position of the user's hand and, based on the position, a set of configuration settings, and/or other variables, determines a display region on the touchscreen to display a graphic (635) associated with the communications and applications. The device displays the graphic within the display region and receives and processes input from the user.

26 Claims, 11 Drawing Sheets

(56) References Cited

U.S. PATENT DOCUMENTS

| | | | |
|---|---|---|---|
| 2004/0156270 | A1 | 8/2004 | Weng |
| 2005/0140646 | A1 | 6/2005 | Nozawa |
| 2006/0033724 | A1 | 2/2006 | Chaudhri et al. |
| 2006/0038745 | A1 | 2/2006 | Naksen et al. |
| 2006/0209218 | A1 | 9/2006 | Lee et al. |
| 2007/0064412 | A1* | 3/2007 | Radley-Smith ............... 362/104 |
| 2007/0097014 | A1 | 5/2007 | Solomon et al. |
| 2007/0204235 | A1* | 8/2007 | Gudi et al. .................... 715/774 |
| 2008/0291225 | A1 | 11/2008 | Arneson |
| 2008/0303782 | A1* | 12/2008 | Grant et al. .................... 345/156 |
| 2009/0265666 | A1* | 10/2009 | Hsieh et al. .................... 715/835 |
| 2010/0045705 | A1 | 2/2010 | Vertegaal et al. |
| 2011/0037866 | A1* | 2/2011 | Iwamoto .................... 348/222.1 |
| 2011/0074700 | A1 | 3/2011 | Sharp |
| 2012/0032979 | A1* | 2/2012 | Blow et al. .................... 345/647 |
| 2012/0092363 | A1* | 4/2012 | Kim et al. .................... 345/618 |
| 2012/0206382 | A1* | 8/2012 | Kusano ........................ 345/173 |
| 2012/0235963 | A1* | 9/2012 | Oshinome et al. ............ 345/204 |

OTHER PUBLICATIONS

Edwin Kee, "Bendable Batteries in the Pipeline?", Ubergizmo, http://www.ubergizmo.com/2011/02/bendable-batteries-in-the-pipeline/. Feb. 28, 2011, 2 pages.

Patent Cooperation Treaty, "PCT Search Report and Written Opinion of the International Searching Authority" for International Application No. PCT/US2013/032886, Jun. 12, 2013, 13 pages.

Peter Rojas, "Another round of Nintendo touch screen controller rumors", Engadget, http://www.engadget.com/2005/03/20/another-round-of-nintendo-touch-screen-controller-rumors, Mar. 20, 2005, 9 pages.

Segger Microcontroller Systeme GmbH, "Embedded Software Solutions—emWin", http://www.segger.com/emwin.html, 2005, 2 pages.

Neo, "Apple Patent: Virtual Input Device Placement on a Touch Screen User Interface", http://www.macsimumnews.com/index.php/archive/apple_patent_virtual_input_device_placement_on_a_touch_screen_user_interface, Feb. 16, 2006, 9 pages.

United States Patent and Trademark Office, "Non-Final Rejection" for U.S. Appl. No. 11/752,828, Jun. 25, 2010, 11 pages.

Patent Cooperation Treaty, "PCT Search Report and Written Opinion of the International Searching Authority" for International Application No. PCT/US2008/062619, Sep. 29, 2008, 10 pages.

United States Patent and Trademark Office, "Final Rejection" for U.S. Appl. No. 11/752,828, Feb. 11, 2011, 13 pages.

United States Patent and Trademark Office, "Non-Final Rejection" for U.S. Appl. No. 11/752,828, Mar. 2, 2012, 10 pages.

* cited by examiner

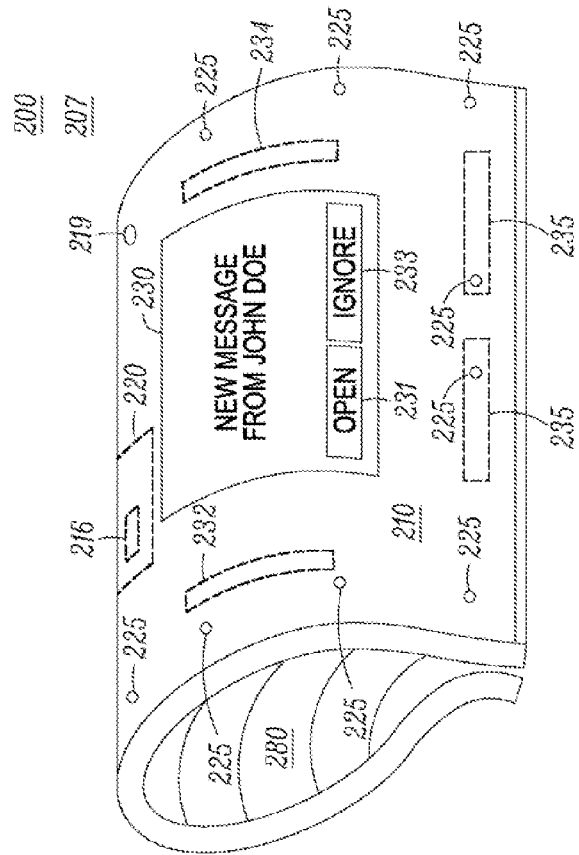
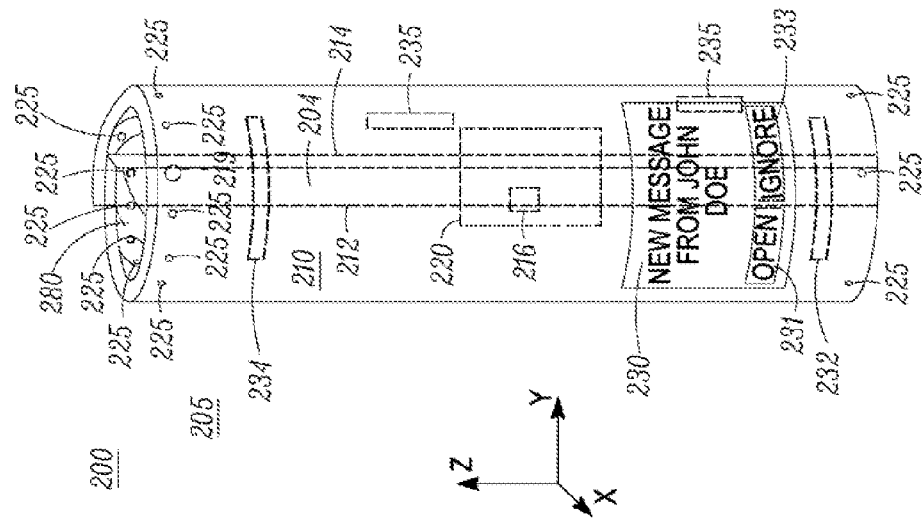
FIG. 2B
FIG. 2A

SYSTEMS AND METHODS FOR MANAGING THE DISPLAY OF CONTENT ON AN ELECTRONIC DEVICE

FIELD

This application generally relates to managing the display of content on a flexible display of an electronic device. In particular, the application relates to platforms and techniques for rearranging input and notification regions and graphics on a flexible touchscreen of an electronic device in response to a user's interactions with the touchscreen.

BACKGROUND

Current electronic devices can offer touchscreen functionality whereby a user can, via the touchscreen, select various device functions for execution, interact with software applications, or otherwise operate the device. The touchscreen offers a convenience and an ease of use by allowing a user to interact directly with graphics and avoid using a keyboard, mouse, touchpad, or other external peripherals.

With the advent of flexible display technology for devices, a user's physical interaction with a flexible display can disrupt the functionalities of the electronic device. For example, when the user holds the display, the output regions used to display information to the user could be covered or concealed by the user's fingers on the device. As a result, the user must exercise care when handling the flexible display and in some cases must release the display to view and interact with the available functions. Accordingly, there is an opportunity to develop techniques to interact with flexible displays.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIGS. 2A and 2B illustrate an example electronic device in accordance with some embodiments.

DETAILED DESCRIPTION

System and methods are disclosed for modifying content displayed on a touchscreen of an electronic device. The electronic device can support communication functionalities, including incoming and outgoing data transmission. A user of the electronic device can interact with the touchscreen to facilitate the communication functionalities. Specifically, electronic device can detect an interaction by the user with the touchscreen. According to embodiments, the electronic device is a rollable device wherein a flexible touchscreen forms an outer surface of the device when in a rolled configuration, and the interaction by the user can include a user grasping or gripping the rollable device. From the interaction, the electronic device identifies a positioning of the user's hand and determines an appropriate region of the touchscreen to display a graphic for responding to or initiating communication functionality. The electronic device displays the graphic within the region and receives input from the user. In some cases, the electronic device can have associated configuration settings that can influence the appropriate region of the touchscreen for displaying the graphics.

The systems and methods as discussed herein can offer features tailored to flexible display technology. In particular, the device displays a graphic associated with a communication function within a display region that is easily accessible to a user. In cases in which the user is grasping or gripping the device, the graphic placement prevents the user from inadvertently selecting undesired functionalities. Further, the graphic placement allows the user to easily select functions without having to release or change his/her grip on the device. In some embodiments, the device can determine a size of the user's hand and scale the graphic based on the hand size. Moreover, the user can configure a set of specifications to customize the location of the graphic placement. It should be appreciated that other benefits and efficiencies are envisioned. As used herein, a "rollable device" can be understood to be an electronic device with any combination of hardware and software that can include a touchscreen surface configured to be at least partly rolled or flexed.

Figure 1:
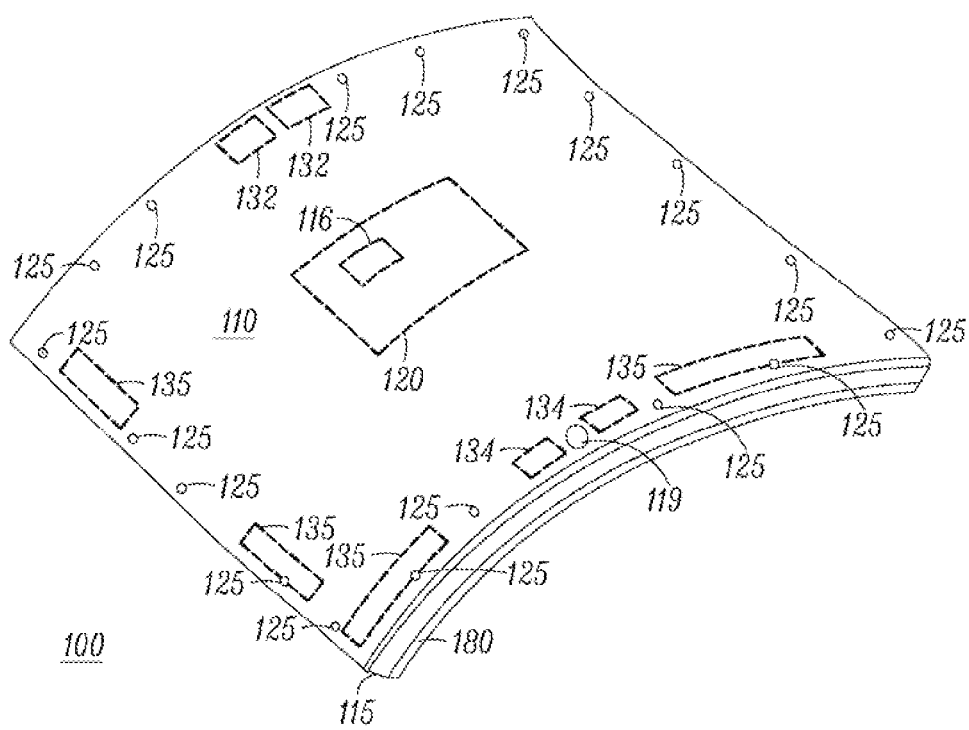
FIG. 1 illustrates an example electronic device in accordance with some embodiments.

FIG. 1 depicts an example electronic device 100 consistent with some embodiments. It should be appreciated that the electronic device 100 is merely an example and can include various combinations of hardware and/or software components.

As shown in FIG. 1, the electronic device 100 can include a display screen 110. According to embodiments, the display screen 110 can be flexible, partially flexible, rollable, or partially rollable and can be configured to display graphical information. Further, the display screen 110 can be a touchscreen capable of receiving inputs from a user of the electronic device 100. More particularly, the display screen 110 can include touchscreen technologies such as resistive panels, surface acoustic wave (SAW) technology, capacitive sensing (including surface capacitance, projected capacitance, mutual capacitance, and self-capacitance), infrared, optical imaging, dispersive signal technology, acoustic pulse recognition, and/or others. Further, the display screen 110 can use display technology such as electrophoretic displays, electronic paper, polyLED displays, AMOLED displays, OLED displays, liquid crystal displays, electrowetting displays, rotating ball displays, segmented displays, direct drive displays, passive-matrix displays, active-matrix displays, and/or others.

As shown in FIG. 1, the electronic device 100 can include a substrate 115 that can be configured to support the display screen 110. In particular, the substrate 115 can be a thin flexible layer with metal, plastic, or other materials or combinations of materials. The display screen 110 and the substrate 115 can individually include one or more parts or components for supporting the display functions such as, for example, backlights, reflectors, and/or other components. The electronic device 100 can further include a flexible battery 180 that can be capable of rolling or flexing in conjunction with the display screen 110 and the substrate 115. The electronic device 100 can be rolled such that the display screen 110 can form at least a part of the outer surface of the electronic device 100. The electronic device 100 can also include a processing module 120 that can be an integrated circuit containing a processor and other components configured to process user input and sensor data, and manage content display functionalities as discussed herein. As shown in FIG. 1, the processing module 120 can be located underneath or adjacent to the flexible battery 180, or can be located in other areas.

As shown in FIG. 1, the electronic device 100 is further configured with a set of overlap sensors 125, optional sets of touch sensors 135, and an optional additional sensor 119. The set of overlap sensors 125 can be placed on or embedded within the display screen 110 so that, when the electronic device 100 is rolled, the overlap sensors 125 can detect, sense, and/or refine a positioning of an overlap region(s) of the display screen 110. In one embodiment, the set of overlap sensors 125 can be CMOS image sensors that can be embedded among display pixels of the display screen 110. Additional overlap sensors (not shown) may be placed on or embedded within the flexible battery 180 and can be CMOS image sensors or other sensors.

In this embodiment, the flattened display screen 110 is rectangular in shape; however, any flattened shape is possible including circular, oval, triangular, polygonal, and irregular (e.g., like a flower, an alphanumeric character, or a leaf). In various embodiments, the set of overlap sensors 125 can be positioned closer or farther from the edges of the respective display screen 110 (or flexible battery 180). Further, it should be appreciated that there can be any number of overlap sensors 125 positioned in any arrangement or orientation on the display screen 110 (or the flexible battery 180). For example, there can be overlap sensors positioned throughout the center area of the display screen 110. In cases where the electronic device 100 is rolled into a more conical or otherwise irregular shape, the overlap sensors positioned near or around the center area, in addition to some of the overlap sensors near the edges, can be blocked or otherwise not detect any light.

During an initialization step, the electronic device 100 can determine the extent of overlap of the display screen 110 with itself by briefly illuminating the entire display screen 110 using a particular light wavelength and sensing which of the overlap sensors 125 receive or do not receive that light. Based on the sensor information, the electronic device 100 can calculate an area where the display screen 110 overlaps with itself. More particularly, the electronic device can detect or approximate the overlap area based which of the overlap sensors 125 do not receive the initial light wavelength or detect any ambient light. A non-overlap area can be defined by the overlap sensors 125 that receive a combination of one or more of the initial light wavelength and ambient light. The overlap sensors 125 that do or do not receive the initial light wavelength and ambient light will vary based on the shape or configuration of the device (e.g., rolled to be conical, cylindrical, etc.), whether the display screen 110 is partially blocked by another structure (e.g., a table or support stand), and/or other factors. For example, if the electronic device 100 is rolled into a conical shape, then some overlap sensors 125 on one end of a particular edge of the electronic device 100 will not detect any light while other overlap sensors 125 on the opposite end of the same edge will detect light. In embodiments, the display screen 110 can include a greater concentration of overlap sensors 125 near the ends of the edges to more accurately detect the overlap regions associated with conical or otherwise irregular configurations.

The optional touch sensors 135 can sense or detect user contact to control some display functionalities of the electronic device 100. In some embodiments, the touch sensors 135 are dynamically-determined areas of the display screen 110 when the display is configured as a touchscreen. In other embodiments, the touch sensors 135 are buttons or keys. As shown in FIG. 1, the touch sensors 135 can be located underneath or adjacent to the flexible battery 180, or can be located in other areas.

The additional sensor 119 can be any type of imaging sensor or detection component, such as a camera or proximity sensor, that can locate objects and detect changes in positions of objects within a proximity of the electronic device 100. For example, the additional sensor 119 can identify a user's position in relation to a section of the rolled-up electronic device 100 and can "follow" the user's movement around the outside of the electronic device 100. For further example, the additional sensor 119 may detect whether sections of the display screen 110 are obscured, for example if the electronic device 100 is lying on a table.

According to embodiments, the electronic device 100 can support a variety of functionalities and applications. For example, the electronic device 100 can support communication functionalities such as telephone calls, text messaging, video calls, Internet browsing, emailing, and/or the like. In the embodiment shown in FIG. 1, piezo elements 132, 134 are positioned and configured to act as microphones and speakers for supporting telephony and other voice functions. For example, a first set of piezo elements 132 can act as microphones and a second set of piezo elements 134 can perform as speakers. Alternately, the piezo elements 132 can act as speakers and the piezo elements 134 can act as microphones, depending on the usage configuration of the device 100. Further, for example, the electronic device 100 can support applications such as games, utilities (e.g., calculators, camera applications, etc.), configuration applications, and/or the like. The electronic device 100 can also support voice-activation technology that allows users to initiate and operate functions and applications of the electronic device 100. In embodiments, the electronic device 100 can be configured to connect to various wired or wireless personal, local, or wide area networks to facilitate communication with network components and/or other devices.

The various functionalities and applications of the electronic device 100 can have associated display regions and graphics configured for presentation or display on the display screen 110. In embodiments, the electronic device 100 can receive inputs, selections, and/or the like via virtual keys displayed on the display screen 110 of the electronic device 100. For example, a telephone application of the electronic device 100 can have a graphic including information or selection options such as a dialpad (e.g., a Bell-type dialpad), a caller ID box, various selections associated with functions of the telephone application (e.g., "Dial," "End," etc.), and/or others. For further example, a text messaging application of the electronic device 100 can have a graphic including information or selection options such as a keyboard (e.g., a QWERTY keyboard), a text history, a contact ID, various selections associated with functions of the text messaging application (e.g., "Send," "Cancel," etc.), and/or others. It should be appreciated that the graphic displayed by the electronic device can include any combination of content that can be displayed such as, for example, characters, letters, icons, images, numbers, and/or the like.

According to embodiments, the processing module 120 of the electronic device 100 can be configured to manage the display of the graphics based on accelerometer 116 measurements, locations of user contact with the display screen 110, viewing positions of the user, and/or other variables. More particularly, the display screen 110 positions the graphics such that, for example, a user's hand will not obscure the displayed graphics. Further, for example, the display screen 110 positions the graphics in regions that allow the user to easily and effectively select options or input information without having to release contact with or re-grip the electronic device 100. In embodiments, a user can specify a set of configuration options that can refine or customize the display of the graphics.

FIG. 2A and FIG. 2B depict different views of an example electronic device 200 in two configurations 205, 207 in accordance with embodiments. The configuration 205 shows a rectangular flexible display (such as the display screen 110) rolled into a tube-like shape and the configuration 207 shows a rectangular flexible display rolled into a "pinch" configuration. It should be appreciated that other configurations are envisioned, including cone-like shapes (see FIG. 4) or other oblique or irregular shapes. Further, in cases in which the electronic device is rectangular in shape, the embodiments envision the configurations 205, 207 as being rolled or shaped either "long-wise" or "short-wise."

The configuration 205 as depicted in FIG. 2A is configured such that a display screen 210 is on the outside surface and a flexible battery 280 is on the inside surface. The electronic device configuration 207 as depicted in FIG. 2B also has the display screen 210 on the outside surface and the flexible battery 280 doubles over itself in a "pinch" configuration, which has a tear-drop-shaped cross section. A processing module 220 can be located on a side of the electronic device opposite from the display screen 210. The processing module 220 can include an accelerometer 216 that can determine an orientation of the electronic device in each configuration 205, 207 with respect to gravity. For example, referring to FIGS. 2A and 2B, gravity can pull in the negative z-axis direction such that the device of configuration 205 is standing "on end" and the device of configuration 207 has its "pinch" region pointing "down." The electronic device 200 can also be configured with an additional sensor 219 to help determine a viewing position of a user, track movements of the user, detect nearby objects or surfaces, and/or perform other optical detection functionalities.

Each of the configurations 205, 207 also depict a graphic 230 that can be displayed on the display screen 210. For example, the graphic 230 can indicate an incoming communication with options to open 231 or ignore 233 the communication. According to embodiments, the device can determine the gravitational direction (e.g., negative z-axis direction) via the accelerometer 216, and can orient or arrange the graphic 230 in an upright position with respect to the gravitational direction. For example, as illustrated in FIGS. 2A and 2B, the graphic 230 in each of the configurations 205, 207 is oriented in an upright position (z-axis direction). It should be understood that the arrangement of the graphic 230 is independent of the orientation or positioning of the electronic device. For example, if the electronic device of the configuration 205 falls on its side, then the device can rotate the graphic 230 orientation such that the graphic 230 is still arranged upright with respect to gravity.

A set of overlap sensors 225 as illustrated with respect to the configuration 205 can be configured to detect, sense, or otherwise locate an overlap region 204 of the electronic device. More particularly, the set of overlap sensors 225 can sense or detect events indicating that at least part of the display screen 210 is obscured as a result of an overlap with itself, the flexible battery 280, and/or other components. In some cases, the set of overlap sensors 225 can detect an overlap with a non-display element, such as a desktop. The overlap sensors 225 can be positioned on the display screen 210 in any type of configuration, as discussed with respect to FIG. 1. As shown in FIG. 2A, the overlap region 204 is defined by lines 212 and 214. For example, when the entire display screen 210 is briefly illuminated using a light of a particular wavelength, the sensors receiving that wavelength of light and the sensors not receiving that wavelength of light can be analyzed to determine the extent of the overlap region 204. When an illumination mode of the configuration 205 is initiated, the flexible display screen 210 can be illuminated except for the overlap region 204. It should be appreciated that the systems and methods contemplate various orientations, amounts of, and location placements for the optional sensor 219 and the set of overlap sensors 225.

As shown in the configuration 205, one or more overlap sensors 225 on one edge of the display screen 210 can be blocked, and thus detect the overlap region 204, while one or more additional overlap sensors 225 on the opposite edge of the display screen 210 can detect ambient light. More particularly, during an initialization step of the electronic device, the additional overlap sensors 225 that are not blocked can detect ambient light as well as the initialization light of the particular wavelength, and the overlap sensors 225 that are blocked can detect little or no light. The size of the calculated overlap region 204 increases as more overlap sensors 225 do not detect any ambient light or the initialization light.

As shown in the configuration 207, one or more overlap sensors 225 on one half of the display screen 210 can be blocked by the surface supporting the electronic device 200, while one or more additional overlap sensors 225 on the other half of the display screen 210 can detect ambient light. More particularly, during an initialization step of the electronic device, the overlap sensors 225 may all detect the initialization light of the particular wavelength but only some of the sensors 225 detect ambient light as well as the initialization light. In other situations, the blocked sensors 225 detect neither initialization light nor ambient light while the other sensors detect both initialization light and ambient light. The size of the blocked overlap region 204 increases as more overlap sensors 225 do not detect any ambient light or the initialization light.

The electronic device in either configuration 205, 207 can further include a substrate that includes an artificial muscle component that can change shape or size when stimulated by an electric charge. For example, the artificial muscle can be an electroactive polymer with piezoelectric materials that can deform when subject to a voltage application, and which also might generate a voltage when mechanically deformed. In operation, the artificial muscle can activate or engage to hold the electronic device in a position. For example, the user can roll the electronic device into a tube-like shape, and the artificial muscle can activate to maintain the shape. In some cases, the bending of the artificial muscle by an external force (e.g., the user) can activate an electrical signal, and a polarity of the signal can indicate a configuration of the electronic device. The electronic device can further include piezo elements 232, 234, configured to act as microphones and speakers for supporting telephony and other voice functions, and touch sensors 235.

Figure 3:
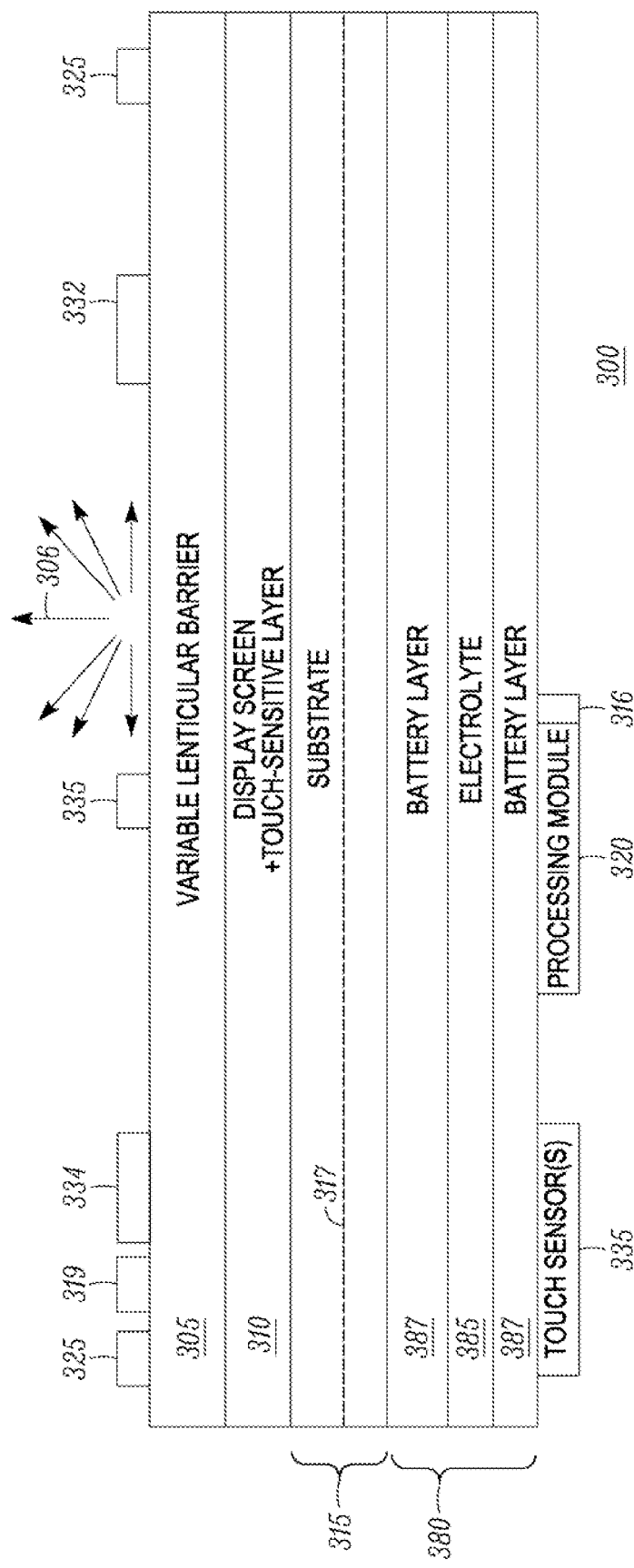
FIG. 3 illustrates an example cross-section view of an electronic device in accordance with some embodiments.

FIG. 3 depicts a cross-section view of an electronic device 300. It should be appreciated that the cross-section view is merely an example and the electronic device 300 can include various combinations of components and placements thereof.

As shown in FIG. 3, the electronic device 300 can include a display screen 310 with a touch-sensitive layer integrated therein. More particularly, the touch-sensitive layer can sense touch events with, for example, a user's hand. The electronic device 300 can include a variable lenticular barrier 305 that can control the direction of the display of content. For example, the variable lenticular barrier 305 can display content in any or all directions as indicated by arrows 306 as shown in FIG. 3. According to embodiments, a user of the electronic device 300 can control the content display direction via one or more touch sensors 335. As shown in FIG. 3, the electronic device 300 can also have one or more overlap sensors 325 and an optional additional sensor 319, as discussed herein. In embodiments, the overlap sensors 325 and the additional sensor 319 can be disposed on the variable lenticular barrier 305, a battery layer 387, or in/on other locations of the electronic device 300, such as within the active matrix of the display screen 310. The electronic device 300 can further include piezo elements 332, 334 configured to act as microphones and speakers for supporting telephony and other voice functions.

The electronic device 300 can further include a substrate 315 that can be capable of supporting the display screen 310. The substrate 315 can include an artificial muscle 317 component that can change shape when stimulated by an electric charge. For example, the artificial muscle 317 can be an electroactive polymer with piezoelectric materials that can deform when subject to a voltage application, and which also generate a voltage when deformed by external forces. In operation, the artificial muscle 317 can activate or engage to hold the electronic device 300 in a position. For example, the user can roll the electronic device 300 into a tube-like shape, and the artificial muscle 317 can activate to maintain the shape. In some cases, the bending of the artificial muscle 317 by an external force (e.g., the user) can activate an electrical signal, and a polarity of the signal can indicate whether the electronic device 300 is rolled with the display screen 310 as an inside surface or an outside surface.

The electronic device 300 can be powered by a battery 380 including one or more battery layers 387 and an electrolyte layer 385. In embodiments, the battery layers 387 can be lithium-ion batteries or other battery types or variants, and can be made using various types of conductive material. Further, in embodiments, the electrolyte layer 385 can have LiPON or other materials or combinations of materials. It should be appreciated that although the battery is depicted as having two battery layers 387 and one electrolyte layer 385, embodiments contemplate various amounts and combinations of layers, as well as materials and compositions thereof. In embodiments, the battery layers 387 and the electrolyte later 385 can be laminated or otherwise affixed to the substrate 315 or other components of the electronic device 300.

According to some embodiments, the electronic device 300 can have a processing module 320, an accelerometer 316, and the one or more touch sensors 335 disposed on the battery layer 387. In operation, the processing module 320 can include an integrated circuit, a processor, and other components, and can be configured to interface with the battery layers 387, the artificial muscle 317, the display screen 310, the variable lenticular barrier 305, the overlap sensors 325, the additional sensor 319, and the one or more touch sensors 335 to process and facilitate the operations and functionalities of the electronic device 300 as discussed herein.

Figure 4:
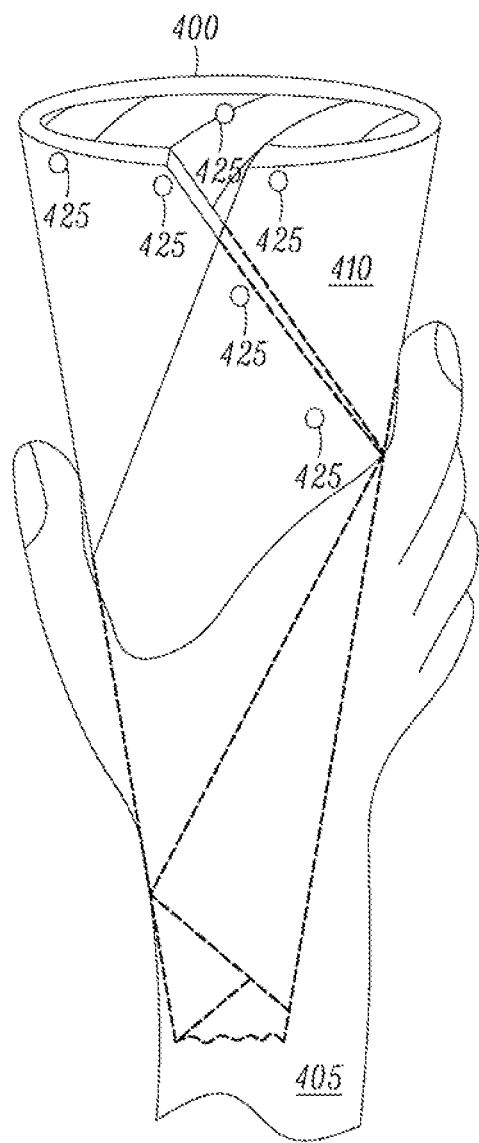
FIG. 4 illustrates an interaction with an electronic device in accordance with some embodiments.

Referring to FIG. 4, depicted is an example rollable device 400 in accordance with embodiments. It should be appreciated that the rollable device 400 is merely an example and other components, sizes of components, and scales of components are envisioned. The rollable device 400 includes a display screen 410 that makes up an outer surface of the rollable device 400 in this configuration, and can display content and receive input from a user at any location(s) of the outer surface. Note that the overlap region in this configuration is triangular rather than rectangular in shape. The rollable device 400 can include a set of overlap sensors 425 positioned on the display screen 410 and/or the flexible battery that can detect the overlap area, as discussed herein.

As shown in FIG. 4, a user's hand 405 is depicted grasping, gripping, or otherwise making contact with the display screen 410. In some cases, the display screen 410 can be inactive or otherwise not displaying any content when contacted by the user's hand 405. If an illumination mode is initiated subsequent to the contact, the display screen 410 can be configured to obscure any overlap areas as well as any areas or regions associated with the user contact. In other cases, the display screen 410 can be in an illumination mode initiated prior to the user's hand 405 contacting the display screen 410. In yet other situations, the illumination mode can be initiated prior to rolling the display screen 410, and the overlap region is subsequently determined as well as the hand 405 contact region. When contacted, the display screen 410 can be configured to obscure any overlap areas as well as any areas or regions associated with user contact.

According to embodiments, the rollable device 400 can determine a position of the user's hand 405 and components thereof (e.g., thumb, index finger, etc.) after the user's hand 405 makes contact with the display screen 410. For example, the display screen 410 can recognize touch events at one or more of a series of nodes of the display screen 410, generate signals corresponding to the touch events, and send the signals to a processor of the rollable device 400. The processor can analyze the signals to determine a mapping of the touch events and the corresponding points of contact by the user's hand 405.

Figure 5:
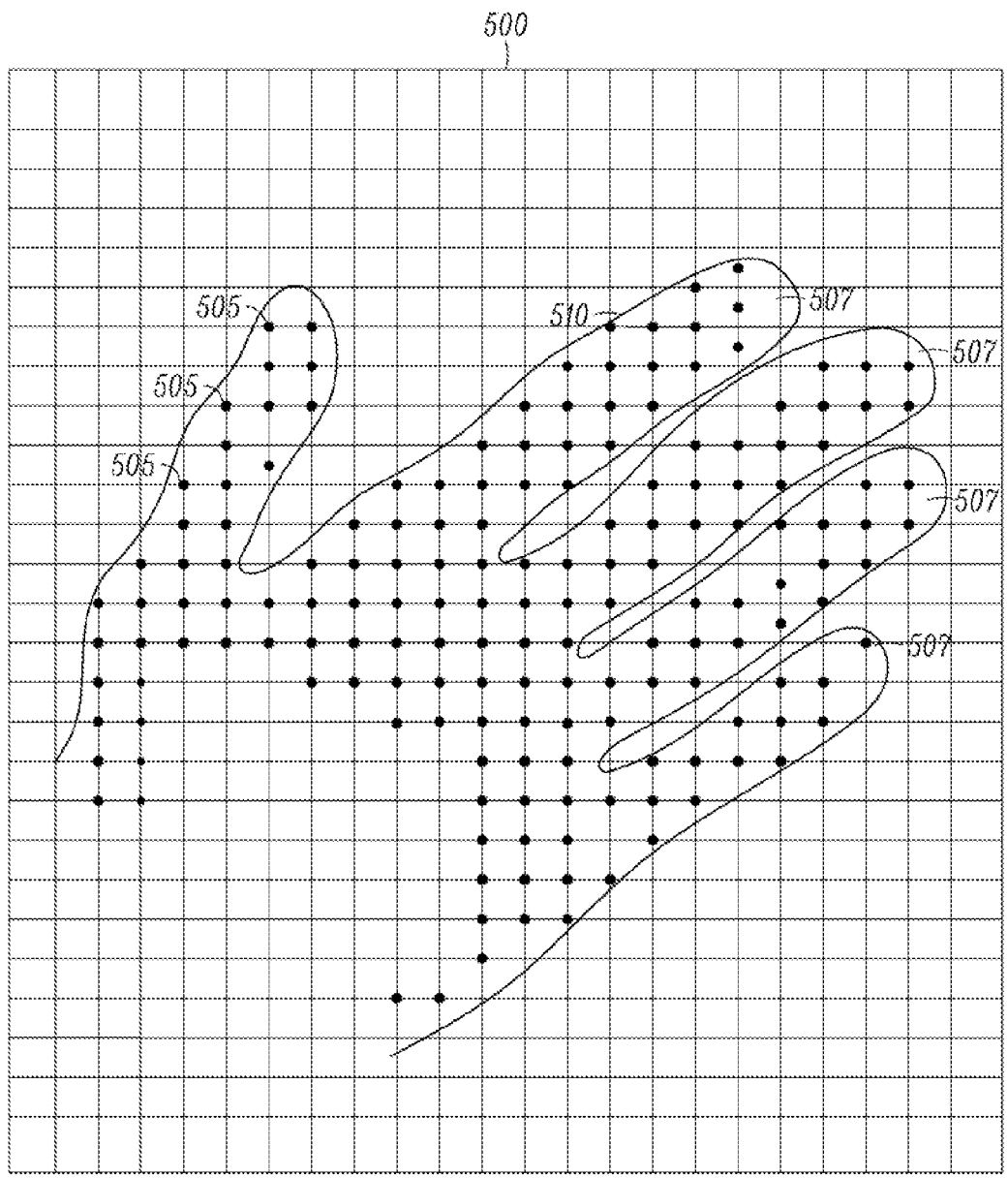
FIG. 5 illustrates an example chart associated with an interaction with an electronic device in accordance with some embodiments.

Referring to FIG. 5, an illustration of a display screen interface 500 and nodes thereof are depicted. More particularly, the display screen interface 500 depicts a two-dimensional view of an outer surface touchscreen of a rollable electronic device (such as the display screen 410 as discussed with respect to FIG. 4). As shown, the display screen interface 500 represents a touchscreen including a series of nodes, depicted as grid line intersections, that can sense a surface contact from, for example, a user's hand. More particularly, the touchscreen can detect a surface contact with one or more contacted nodes 505. Further, the touchscreen can generate a signal(s) in response to the nodes 505 being contacted and transmit the signal(s) to a processor of the electronic device. Upon receipt, the processor can generate an image of the display screen interface 500 at a particular point in time, and in response to the nodes 505 sensing contact. In embodiments, the signals corresponding to the contacted nodes 505 can have indications of high or low points based on changes in capacitance due to the surface contact at each of the contacted nodes 505. The processor can compare the generated image to previous images to identify changes in surface contact as well as determine which action(s) to perform. For example, the processor can detect that a user's hand re-grips the display screen interface 500 and determine that a graphic can be re-displayed at a location or region based on the new nodes that sense contact. Thus, a formerly obscured region can become unobscured.

According to embodiments, the processor can analyze the signals corresponding to the contacted nodes 505 to determine an outline 510 of a user's hand. More particularly, the processor can approximate the sizes and locations of individual fingers, locate fingertips 507, and can generate the outline 510 according to the approximations. In some cases, the outline 510 can encompass most or all of the contacted nodes 505 at a point in time. In other cases, some user grips will only include the area contacted by the fingertips 507. In embodiments, the processor can determine or approximate a size of the user's hand based on the shape and size of the outline 510 or the size of the fingertips 507 and distance between the detected fingertips 507. Further, the processor can examine the outline 510 to determine which hand (left or right) is contacting the touchscreen, as well as the specific fingers (e.g., thumb, index finger, etc.) and the locations of the specific fingers.

Figure 6:
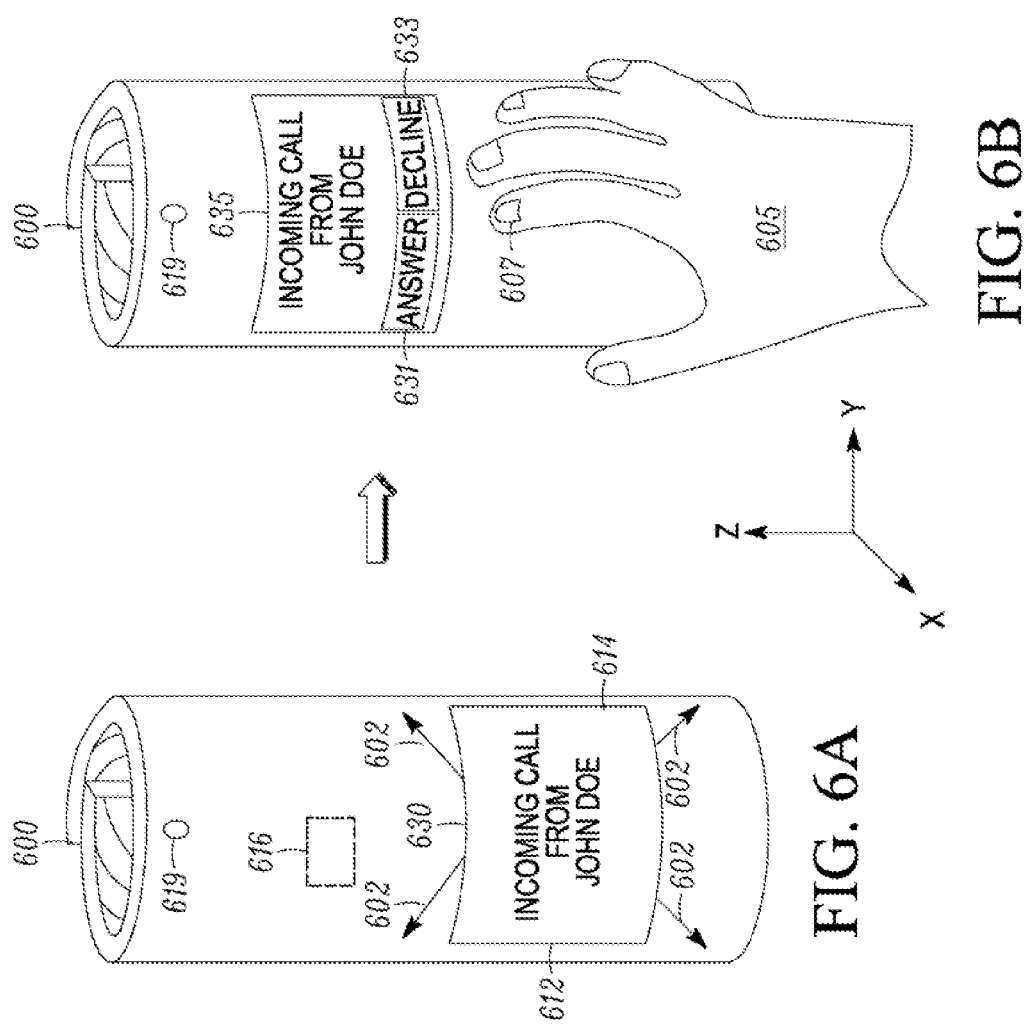
FIGS. 6A and 6B illustrate an interaction with an electronic device in accordance with some embodiments.

FIG. 6A and FIG. 6B depict an example rollable electronic device 600 that supports communication functionalities. In embodiments as shown, the communication is an incoming call, however other communications and functionalities thereof are envisioned. Referring to FIG. 6A, the electronic device 600 can detect the incoming call without, or prior to, any interaction with a user. In response to detecting the call, an accelerometer 616 of the electronic device 600 can identify an orientation of the electronic device 600. More particularly, the accelerometer 616 can identify an upward orientation for graphics displayed by the electronic device 600 based on a "z-axis" with respect to gravity. Further, the electronic device 600 can identify a viewing position of the user via an additional sensor 619 such as a camera or proximity sensor. For example, the user can be positioned at various locations around the circumference of the electronic device 600. In some embodiments, the sensor 619 can detect which areas of the touchscreen are exposed or obscured. For example, the electronic device 600 can be lying on its side with part of the electronic device 600 contacting a surface and thus obscuring the current "bottom" of the device 600.

The touchscreen of the electronic device 600 can display a notification 630 of the incoming call. For example, the notification 630 can indicate the incoming call and the source of the incoming call. In embodiments, the location of the notification 630 can be based on the viewing position of the user and/or the area(s) of the touchscreen that is exposed, as detected via the sensor 619 and overlap sensors (not shown). Further, the orientation of the notification 630 can be based on the orientation of the electronic device 600 with respect to gravity as detected by the accelerometer. For example, the notification 630 can face "up" even though the electronic device 600 may be on its side. In some cases, the notification 630 can include selectable options to answer 631 or decline 633 the call. The touchscreen can display the notification 630 in motion 602 throughout the touchscreen area. More particularly, the motion 602 can be a random or programmed motion that "moves" the notification 630 at various speeds throughout the touchscreen area. In some embodiments, the motion 602 can correspond to the notification 630 resizing larger or smaller, pulsing, and/or displaying in other movements. Further, the notification 630 can display on any area of the touchscreen except for an area defined by an overlap of the touchscreen and/or other non-display elements, such as a desktop, as sensed by one or more overlap sensors.

In some embodiments, the electronic device 600 can be equipped with one or more audio components, such as a piezo element microphone and/or speaker, that can activate or deactivate based on the viewing position of the user, any overlaps in the touchscreen, and/or any obscured or exposed areas or regions. More particularly, the electronic device 600 can identify one of more of the audio components that face toward the user. In this way, the electronic device 600 can efficiently and effectively transmit audio to and/or receive audio from the user. In embodiments, the audio components can be speakers or microphones, such as piezoelectric speakers or microphones.

According to embodiments, the touchscreen of the electronic device 600 can sense contact by a user's hand 605. In response to sensing the contact, the rollable device 600 can identify or determine the components of the user's hand 605 such as, for example, an outline of the user's hand 605, the sizes, types, and locations of the fingertips, and/or other information, as discussed herein. Further, the rollable device can examine any configuration settings associated with the display of notifications. For example, the configuration settings can specify that the notification graphic 635 should be displayed near or under an index finger 607 of the user. In addition, when the contact by the user's hand 605 is sensed, the electronic device 600 can terminate the in-motion display of the notification 630 and display a notification graphic 635 (in this case, a notification having a graphic similar to notification 630) at an appropriate region of the touchscreen based on the position of the user's hand 605 and optionally the configuration settings. For example, referring to FIG. 6B, the notification graphic 635 is located near the index finger 607 of the user's right hand 605. Further, the user can select to answer 631 or decline 633 the incoming call with his/her index finger 607 without having to release his/her grip of the rollable device 600. In embodiments, the user can reposition the notification graphic 635 to any location or region on the touchscreen via various gestures or combinations of gestures. For example, the user can drag-and-drop the graphic 635, swipe at the graphic 635, and/or perform other single- or multi-touch gestures.

Figure 7:
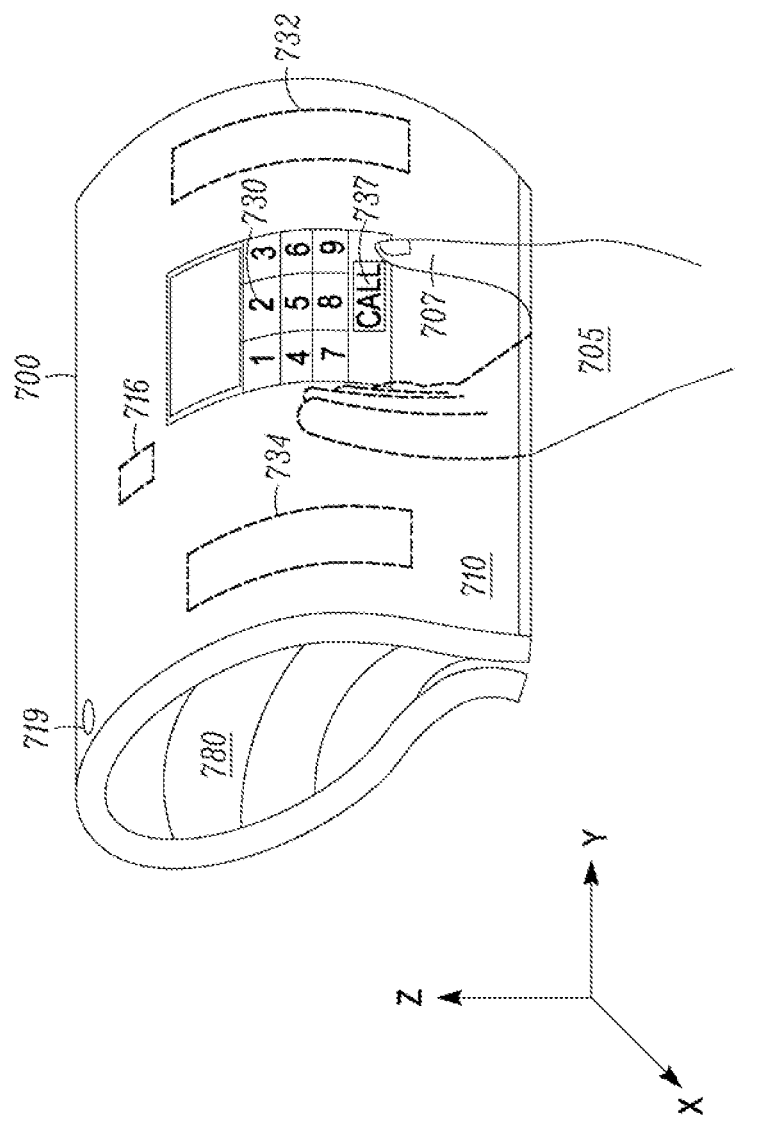
FIG. 7 illustrates an interaction with an electronic device in accordance with some embodiments.

FIG. 7 depicts an example rollable electronic device 700 that supports communication functionalities. In this example, the electronic device 700 is in a "pinch" configuration (see FIG. 2B) with the flexible display screen 710 as an outer surface and the flexible battery 780 as an inner surface. In embodiments as shown, the communication is an outgoing call, however other communications and functionalities thereof are envisioned. For example, a user can use the rollable device 700 to send an outgoing text message. In embodiments, the user can initiate the outgoing communication functionalities in various ways. For example, in some cases, the user can select an appropriate function from the electronic device 700 itself, such as from a menu or application. In other cases, the electronic device 700 can initiate the functionalities in response to a voice command received from the user. In further cases, the user can initiate the functionalities via single- or multi-touch gestures with the touchscreen of the electronic device 700, and/or via other interactions with the electronic device 700.

In some cases, in response to the user initiating the function, an accelerometer 716 of the electronic device 700 can identify an orientation of the electronic device 700. More particularly, the accelerometer can identify an upward orientation based on a "z-axis" with respect to gravity. Further, the electronic device 700 can identify a viewing position of the user via a sensor 719 such as a camera or proximity sensor, as discussed herein. For example, the user can be positioned at various locations around the circumference of the electronic device 700. In some embodiments, the sensor 719 can detect which areas of the touchscreen are exposed or obscured. For example, the electronic device 700 can be lying on its side with part of the electronic device 700 contacting a surface.

During or after initiation of the outgoing call function, the touchscreen of the electronic device 700 can display a dial pad 730 for receiving input from the user. In some cases, the touchscreen can display the dial pad 730 in motion throughout the surface of the touchscreen, as similarly discussed herein with respect to FIG. 6A. The location or region of the dial pad 730 can be based on the viewing position of the user and/or the area(s) of the touchscreen that is exposed as detected via the sensor 719 and/or overlap sensors (not shown). Further, the orientation of the dial pad 730 can be based on the orientation of the electronic device 700 as detected by the accelerometer 716. For example, the dial pad 730 can face "up" with respect to the z-axis even though the electronic device 700 may be on its side. In embodiments, the dial pad 730 can be a Bell-type keypad that includes selectable alphanumeric characters, or other types of keypads or input regions. For example, in cases in which the outgoing communication is a text message, the touchscreen can display a QWERTY keyboard. In some cases, the dial pad 730 can display on any area of the touchscreen except for an area defined by an overlap of the touchscreen, as sensed by one or more overlap sensors (not shown).

In some embodiments, the electronic device 700 can be equipped with one or more audio components, such as piezo elements 732, 734 for use as a microphone and/or a speaker, that can activate or deactivate based on the viewing position of the user, any overlaps in the touchscreen, and/or any obscured or exposed areas or regions. More particularly, the electronic device 700 can identify one of more of the audio components that face toward the user. In this way, the electronic device 700 can efficiently and effectively transmit audio to and/or receive audio from the user. In embodiments, the audio components can be speakers or microphones, such as piezoelectric speakers or microphones.

According to embodiments, the touchscreen of the electronic device 700 can sense contact by a user's hand 705. In response to sensing the contact, the electronic device 700 can identify or determine the components of the user's hand 705 such as, for example, the outline of the user's hand 705, the sizes, types, and locations of the fingertips, and/or other information such as the distance between fingers, as discussed herein. Further, the electronic device 700 can examine any configuration settings associated with the display of input regions. For example, the configuration settings can specify that the dial pad 730 should be displayed near the thumb 707 of the user. For further example, the configuration settings can specify that the "5" key of the dial pad 730 should be displayed under the thumb 707 of the user. In addition, when the contact by the user's hand 705 is sensed, the electronic device 700 can terminate any in-motion display of the dial pad 730 and transition the dial pad 730 to an appropriate location of the touchscreen based on the position of the user's hand 705 and the configuration settings. For example, referring to FIG. 7, the dial pad 730 is located near the thumb 707 of the user's left hand 705. Further, as shown in FIG. 7, the user can select to call 737 an appropriate party based on the number that is entered into the dial pad 730 via, for example, the thumb 707 or a finger of the other hand. In embodiments, the user can reposition the dial pad 730 to any location or region on the touchscreen via various gestures or combinations of gestures. For example, the user can drag-and-drop the dial pad 730, swipe at the dial pad 730, and/or perform other single- or multi-touch gestures.

Figure 8:
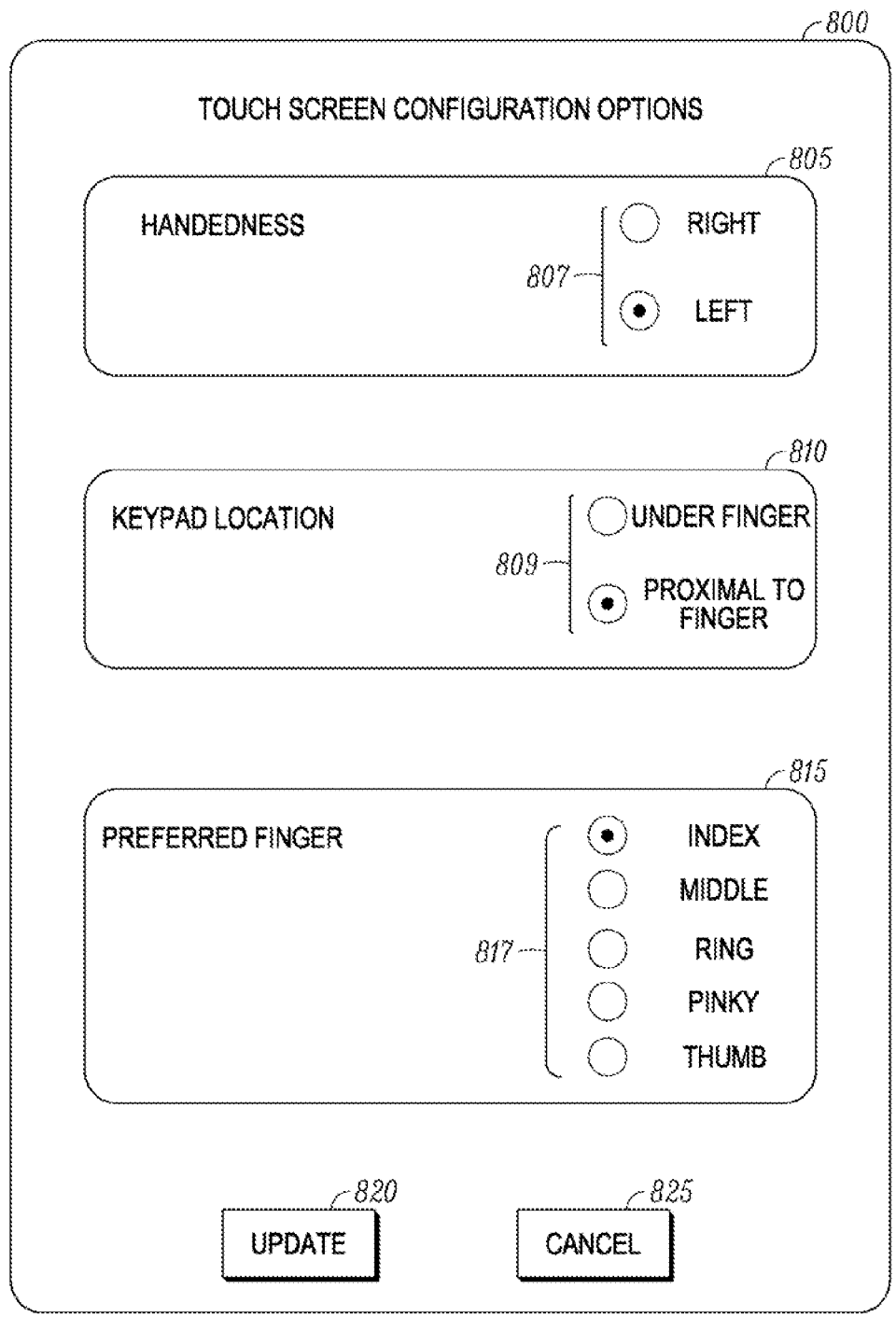
FIG. 8 illustrates an example interface of an electronic device in accordance with some embodiments.

FIG. 8 details an example user interface of an electronic device (such as the device 100 as shown in FIG. 1). More particularly, the user interface can be a configuration options screen 800 that can be displayed on a touchscreen of the electronic device. The options screen 800 can allow the user to select various options associated with displaying the notifications and the graphics as discussed herein. It should be appreciated that the options screen 800 and options thereof are examples and can include other various options and combinations of options.

The options screen 800 includes a handedness selection 805. More particularly, the handedness selection 805 has options 807 for right and left handedness. If the user selects the right handedness option, then the user can envision handling the electronic device primarily with his or her right hand. Similarly, if the user selects the left handedness option, then the user can envision handling the electronic device primarily with his or her left hand. It should be appreciated that in some embodiments, the device can automatically detect which hand (left or right) is handling the electronic device, based on the detected position of fingertips and models of common hand positions, and can modify a handedness setting accordingly. The options screen 800 further includes a keypad location section 810 with options 809 related to where a graphic will be displayed on the electronic device. As shown, the options 809 can include options to display the keypad under a finger or proximal to the finger. For example, if a user desires to initiate a telephone call, then in response to the user grasping or gripping the electronic device, the keypad to enter in an associated telephone number can display under one of the user's fingers or proximal to the user's finger.

Further, the options screen 800 includes a preferred finger section 815 including options 817 for the user to select a finger from which the graphic location is determined. In particular, if the user selects the index finger, then the graphic to respond to or initiate a communication or function can be displayed under or near the index finger. The user can make similar selections for the thumb, middle, ring, and pinky fingers, as shown in FIG. 8. If the user is satisfied with the selections of the options screen 800, then the user can select an update option 820, shown as a virtual key displayed on the touch screen, to save the selected options. Further, the user can select a cancel option 825 to cancel any selections made on the options screen 800.

Figure 9:
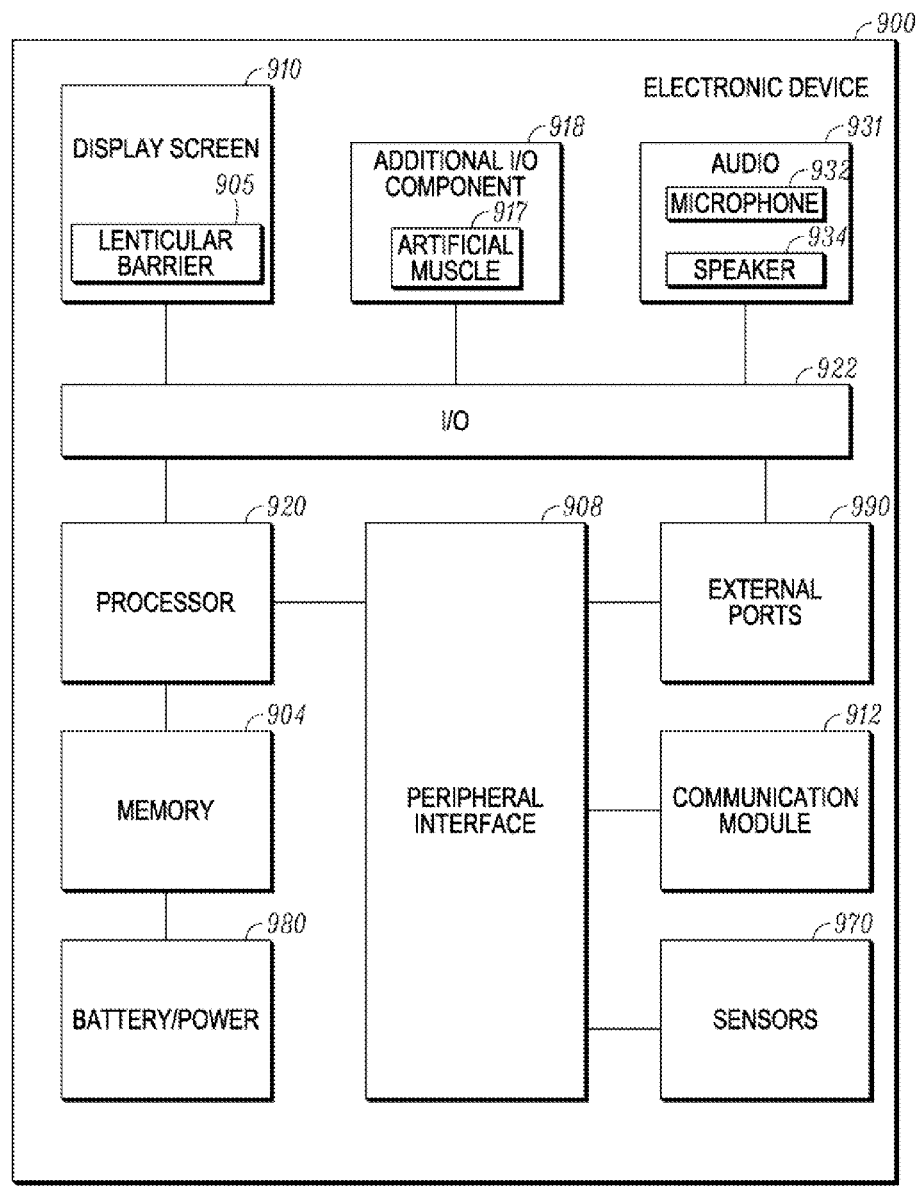
FIG. 9 is a block diagram of an electronic device in accordance with some embodiments.

FIG. 9 illustrates an example electronic device 900 in which the embodiments may be implemented. The electronic device 900 can include a processor 920, memory 904 (e.g., hard drives, flash memory, MicroSD cards, and others), a power module 980 (e.g., flexible batteries, wired or wireless charging circuits, etc.), a peripheral interface 908, and one or more external ports 990 (e.g., Universal Serial Bus (USB), HDMI, Firewire, and/or others). The electronic device 900 can further include a communication module 912 configured to interface with the one or more external ports 990. For example, the communication module 912 can include one or more transceivers functioning in accordance with IEEE standards, 3GPP standards, or other standards, and configured to receive and transmit data via the one or more external ports 990. More particularly, the communication module 912 can include one or more WWAN transceivers configured to communicate with a wide area network including one or more cell sites or base stations to communicatively connect the electronic device 900 to additional devices or components. Further, the communication module 912 can include one or more WLAN and/or WPAN transceivers configured to connect the electronic device 900 to local area networks and/or personal area networks, such as a Bluetooth® network.

The electronic device 900 can further include one or more sensors 970 such as, for example, accelerometers, gyroscopic sensors (e.g., three angular-axis sensors), proximity sensors (e.g., light detecting sensors, or infrared receivers or transceivers), tilt sensors, cameras, and/or other sensors; and an audio module 931 including hardware components such as a speaker 934 for outputting audio and a microphone 932 for receiving audio. In embodiments, the speaker 934 and the microphone 932 can be piezoelectric components. The electronic device 900 further includes an input/output (I/O) controller 922, a display screen 910, and additional I/O components 918 (e.g., an artificial muscle 917, capacitors, keys, buttons, lights, LEDs, cursor control devices, haptic devices, and others). The display screen 910 and the additional I/O components 918 may be considered to form portions of a user interface (e.g., portions of the electronic device 900 associated with presenting information to the user and/or receiving inputs from the user).

In embodiments, the display screen 910 is a touchscreen display with singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others. Further, the display screen 910 can include a thin, transparent touch sensor component superimposed upon a display section that is viewable by a user. For example, such displays include capacitive displays, resistive displays, surface acoustic wave (SAW) displays, optical imaging displays, and the like. The display screen can also include a lenticular barrier 905 (see FIG. 3) configured to control an illumination direction.

The display screen 910 can be configured to interact with various manipulators, such as a human finger or hand. Each type of manipulator, when brought into contact with the display screen 910, can cause the display screen 910 to produce a signal that can be received and interpreted as a touch event by the processor 920. The display screen 910 can also detect any overlap regions associated with the electronic device 900. The processor 920 is configured to determine the location of the contact on the surface of the display screen 910, as well as other selected attributes of the touch event (e.g., movement of the manipulator(s) across the surface of the screen, directions and velocities of such movement, touch pressure, touch duration, and others).

The display screen 910 or one of the additional I/O components 918 can also provide haptic feedback to the user (e.g., a clicking response or keypress feel) in response to a touch event. The display screen 910 can have any suitable rectilinear or curvilinear shape, and may be oriented, rolled, or otherwise manipulated in any desired fashion. The illustrated embodiments, without loss of generality, depict rectangular regions rolled into a tube-like shape (see FIGS. 6A and 6B). However, embodiments comprehend any range of shapes, sizes, and orientations for the display screen 910 such as, for example, tear drop-like (see FIG. 7) or cone-like shapes (see FIG. 4), semi-rolled shapes, and/or the like. In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 920 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 10:
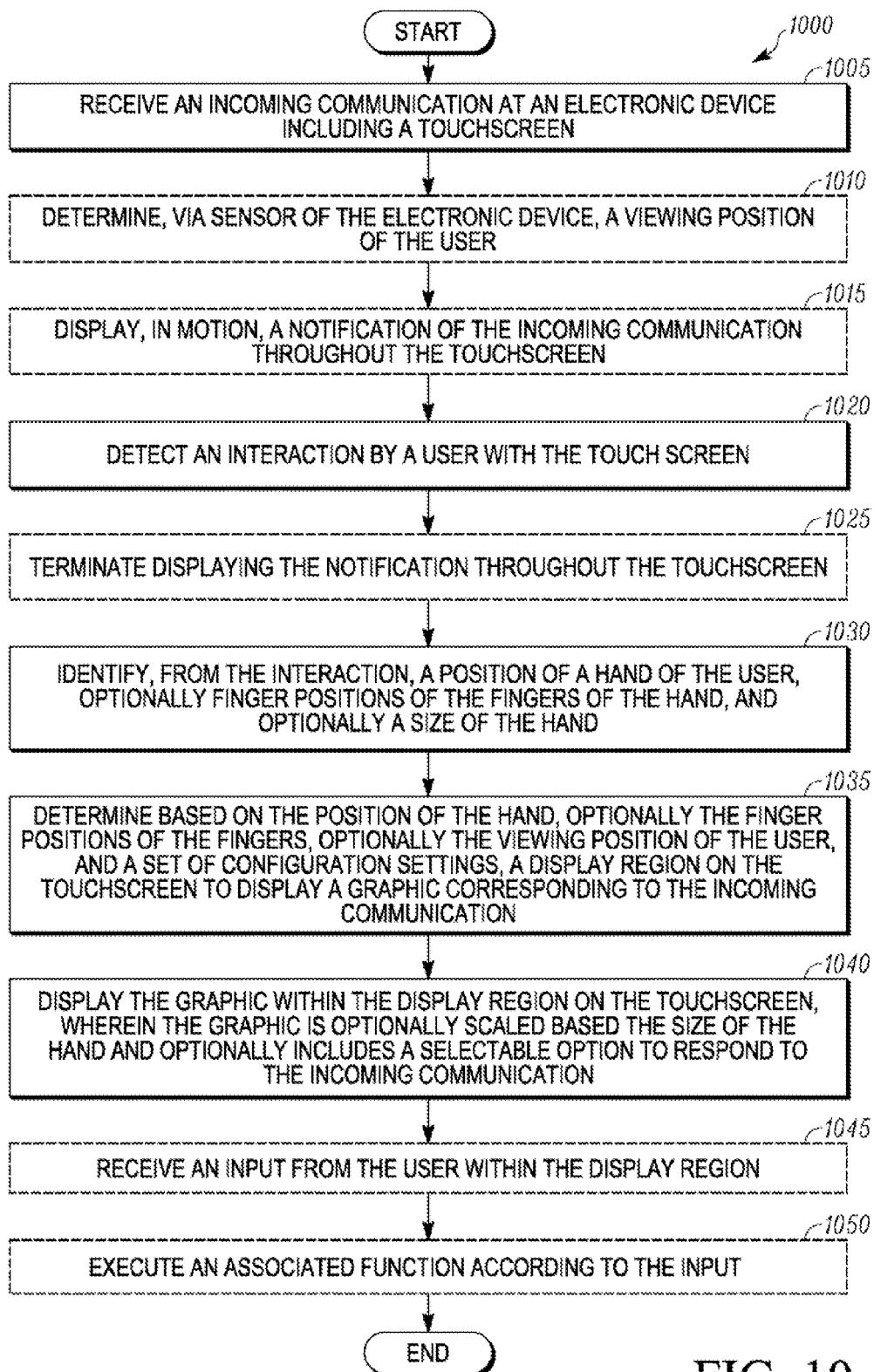
FIG. 10 is a flow diagram depicting content display management in accordance with some embodiments.

FIG. 10 is a flowchart of a method 1000 for an electronic device (such as the electronic device 100 as shown in FIG. 1) to manage the display of content on a display screen of the electronic device. More particularly, the method 1000 relates to the electronic device managing the display of content in response to receiving an incoming communication.

The method 1000 begins with the electronic device receiving 1005 an incoming communication. For example, the incoming communication can be a text message (e.g., SMS, MMS, etc.), telephone call, or other data communication. The electronic device optionally determines 1010, via a sensor of the electronic device, a viewing position of the user. For example, the sensor can be a camera configured to detect the presence and/or location of a user relative to the display. The electronic optionally displays 1015, in motion throughout the touchscreen, a notification of the incoming communication. More particularly, the notification can "bounce" around the touchscreen area of the electronic device so that a user of the electronic device has a greater chance of seeing or noticing the notification. In embodiments, the notification can be a pop-up notification that can indicate the communication and/or a source of the communication, and a display region of the notification can be based on the viewing position of the user.

The electronic device detects 1020 an interaction by the user with the touchscreen. For example, the user can grasp the electronic device (such as illustrated in FIG. 4) with his/her left or right hand such that multiple fingers of the user's hand are in contact with the touchscreen. The electronic device optionally terminates 1025 displaying the notification in motion throughout the touchscreen and identifies 1030, from the interaction, a position of a hand of the user. In some cases, the electronic device can optionally identify finger or fingertip positions of the individual fingers of the hand, the handedness (right or left), and a size of the hand, in accordance with the functionalities as discussed herein.

The electronic device determines 1035, based on the position of the hand (and optionally the finger position(s) of the finger(s)), a display region on the touchscreen to display a graphic corresponding to the incoming communication. For example, the display region can be in proximity to the user's hand, or specifically the user's index finger (or other fingers) such that the user does not need to release or re-grip the electronic device to interact with the graphics. In some cases, the display region can be underneath one of the user's fingers, such as the user's index finger. In embodiments, the display region can also be determined based on the viewing position of the user and/or a set of configuration settings relating to preferences of the user. The electronic device displays 1040 the graphic within the display region on the touchscreen. In embodiments, the electronic device can optionally scale the graphic based on the size of the hand, and the graphic can optionally include a selectable option to respond to the incoming communication. For example, if the incoming communication is a telephone call, then the graphic can include an "answer" option and/or other elements. For further example, if the incoming communication is a text message, then the graphic can include a virtual keyboard or keypad, a "send" option, and/or other elements.

The electronic device optionally receives 1045 an input from the user within the display region. For example, the user can select to answer a telephone call by contacting a virtual button on a touchscreen or the user can view a text message by touching a key on a virtual keyboard. The electronic device optionally executes 1050 an associated function according to the input. For example, the electronic device can connect to an incoming telephone call if the user selects to answer the telephone call, or the electronic device can display and reply to an incoming text message as the user directs. It should be appreciated that other associated functions related to incoming communications are envisioned.

Figure 11:
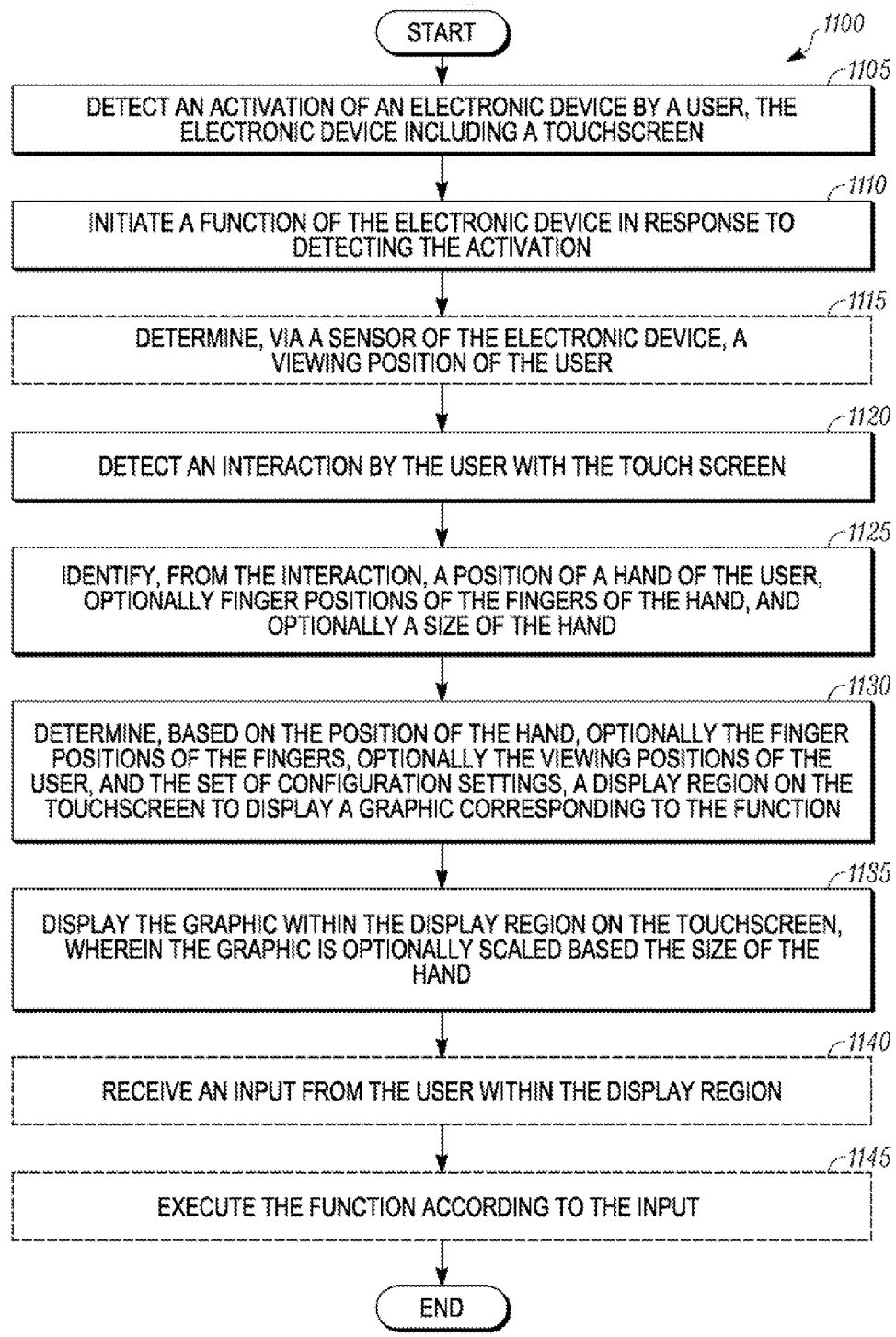
FIG. 11 is a flow diagram depicting content display management in accordance with some embodiments.

FIG. 11 is a flowchart of a method 1100 for an electronic device (such as the electronic device 100 as shown in FIG. 1) to manage the display of content on a touchscreen of the electronic device. More particularly, the method 1100 relates to the electronic device managing the display of content in response to the user initiating a function such as an outgoing communication or other application.

The method 1100 begins with the electronic device detecting 1105 an activation of the electronic device by a user, wherein the electronic device includes a touchscreen. The electronic device initiates 1110 a function of the electronic device in response to detecting the activation. For example, the function can be an outgoing communication such as a telephone call or a text message (e.g., SMS, MMS, etc.). In some cases, the function can be associated with an application of the electronic device, such as a calendar function, a calculator function, a game, a camera application, or the like. In embodiments, initiating the function results in displaying a graphic on the touchscreen such as, for example, a dialpad.

The electronic device optionally determines 1115, via a sensor of the electronic device, a viewing position of the user. For example, the sensor can be a camera configured to detect the presence and/or location of a user relative to the display. The electronic device detects 1120 an interaction by the user with the touchscreen. For example, the user can grasp the electronic device (such as illustrated in FIG. 4) with his/her left or right hand such that multiple fingers of the user's hand are in contact with the touchscreen. The electronic device identifies 1125, from the interaction, a position of a hand of the user. In some cases, the electronic device can optionally identify finger or fingertip positions of the individual fingers of the hand, the handedness (right or left), and a size of the hand, in accordance with the functionalities as discussed herein. It should be appreciated that the electronic device can detect the interaction by the user before initiating the function.

The electronic device determines 1130, based on the position of the hand (and optionally the finger position(s) of the finger(s)), a display region on the touchscreen to display a graphic corresponding to the associated function. For example, the display region can be in proximity to the user's hand, or specifically the user's index finger (or other fingers) such that the user does not need to release or re-grip the electronic device. In some cases, the display region can be underneath one of the user's fingers, such as the user's index finger. In embodiments, the display region can also be determined based on the viewing position of the user and/or a set of configuration settings relating to preferences of the user. The electronic device displays 1135 the graphic within the display region on the touchscreen. In embodiments, the electronic device can optionally scale the graphic based on the calculated size of the hand. Further, the graphic can include a selectable option for the user to facilitate a communication and/or perform other functions. For example, if the function is a telephone application, then the graphic can include a dial pad and/or similar elements. For further example, if the function is a text messaging application, then the graphic can include a virtual keyboard or keypad, a "send" option, and/or other elements.

The electronic device optionally receives 1140 an input from the user within the display region. For example, the user can enter a telephone number into a dial pad, or enter values into a calculator application. The electronic device optionally executes 1145 the function according to the input. For example, the electronic device can dial out to an entered phone number, or the electronic device can perform a calculation based on entered values. It should be appreciated that other associated functions related to outgoing communications and/or other functions are envisioned.

Thus, it should be clear from the preceding disclosure that a method and apparatus effectively and efficiently manages the display of content on a display screen of an electronic device. The method and apparatus advantageously allows a user of the electronic device to navigate though functions of the electronic device and input content into graphics without having to adjust a grip or hold on the electronic device. Further, the method and apparatus advantageously re-displays content in response to a user adjusting contact with the touchscreen.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method in an electronic device, the method comprising:
   receiving, at the electronic device, an indication of an incoming communication;
   displaying a notification of the incoming communication in a notification area along an outside surface of a touchscreen of the electronic device, wherein the touchscreen can be rolled to form the outside surface;
   changing a boundary location of the notification area on the outside surface while displaying the notification in the notification area;
   detecting an interaction by the user with the touchscreen; and
   in response to the detecting the interaction by the user, terminating the displaying of the notification along the outside surface;
   identifying, from the interaction, a position of a hand of the user;
   determining, by a processor based on the position of the hand, a display region on the outside surface of the touchscreen to display a graphic; and
   displaying, within the display region on the touchscreen, the graphic.

2. The method of claim 1, further comprising:
   determining, via a sensor of the electronic device, a viewing position of the user, wherein the display region is further determined based on the viewing position.

3. The method of claim 2, further comprising:
   identifying, based on the viewing position of the user, which of one or more audio components of the electronic device to activate; and
   activating the one or more audio components that were identified.

4. The method of claim 1, wherein the determining the display region on the outside surface of the touchscreen comprises:

detecting an overlap area of the outside surface where the outside surface overlaps within itself; and determining the display region within an area of the outside surface except for the overlap area.

5. The method of claim 1, wherein the displaying the graphic comprises:

identifying, from the interaction, a size of the hand;

determining an input graphic size based on the size of the hand; and scaling the graphic based on the input graphic size.

6. The method of claim 1, wherein when the graphic is associated with an incoming communication, the displaying the graphic comprises:

displaying, within the display region, an interactive panel for the user to respond to the incoming communication.

7. The method of claim 1, wherein the determining the display region on the outside surface of the touchscreen comprises:

identifying, from the interaction, a finger position of a finger of the hand; and determining, based on the finger position, the display region.

8. The method of claim 7, wherein the graphic comprises a Bell-type keypad, and wherein the displaying the graphic comprises:

displaying the Bell-type keypad within the display region, wherein a "5" key of the Bell-type keypad is displayed at the finger position.

9. The method of claim 1, further comprising:

identifying, from the interaction, the hand as either a left hand or a right hand of the user; and modifying a setting according to the left hand or the right hand being identified.

10. The method of claim 1, wherein the displaying the graphic comprises:

receiving, from an accelerometer, a reading indicating a gravitationally upward direction;

identifying an orientation of the graphic based on the reading; and displaying, within the display region on the touchscreen, the graphic according to the orientation.

11. The method of claim 1, further comprising:

detecting, with a sensor of the electronic device, a viewing position of the user; and changing the boundary location of the notification area based on the detected viewing position of the user.

12. The method claim 1, further comprising:

detecting, with a sensor of the electronic device, an area of the touchscreen that is exposed; and changing the boundary location of the notification area based on the detected area of the touchscreen that is exposed.

13. The method of claim 1, further comprising:

detecting, with a sensor of the electronic device, an orientation of the electronic device; and changing the boundary location of the notification area based on the detected orientation of the electronic device.

14. The method of claim 1, wherein the displaying the notification comprises:

moving the notification according to one of the group consisting of: random motion of the notification and a predetermined motion pattern of the notification.

15. The method of claim 14, wherein the motion is selected from the group consisting of: resizing the notification to be larger, resizing the notification to be smaller, and pulsing the notification.

16. The method of claim 1, further comprising:

activating, according to a detection by a sensor of the electronic device, an illumination mode.

17. The method of claim 16, wherein the illumination mode is activated before the user contacts the touchscreen according to the detection of the user by the sensor.

18. An electronic device comprising:

a flexible display including a touch-sensitive layer;

a processor configured to interface with the flexible display and perform operations comprising:

receiving an indication of an incoming communication;

displaying a notification of the incoming communication in a notification area along an outside surface of the flexible display, wherein the flexible display can be rolled to form the outside surface;

changing a boundary location of the notification area on the outside surface while displaying the notification in the notification area;

detecting an interaction by the user with the touch-sensitive layer; and in response to the detecting the interaction by the user, terminating the displaying of the notification along the outside surface;

identifying, from the interaction, a position of a hand of the user, determining, based on the position of the hand, a display region on the flexible display to display a graphic, and displaying, within the display region, the graphic.

19. The electronic device of claim 18, wherein the electronic device further comprises:

a sensor, and wherein the processor is further configured to interface with the sensor and perform actions comprising:

determining, via the sensor, a viewing position of the user, wherein the display region is further determined based on the viewing position.

20. The electronic device of claim 19, wherein the electronic device further comprises:

one or more audio components, and wherein the processor is further configured to interface with the one or more audio components and perform actions comprising:

identifying, based on the viewing position of the user, which of the one or more audio components to activate, and activating the one or more audio components that were identified.

21. The electronic device of claim 18, wherein the electronic device further comprises:

an overlap sensor, and wherein the processor is further configured to interface with the overlap sensor and perform the determining comprising:

detecting an overlap area of the flexible display where the flexible display overlaps with itself, and determining the display region within an area of the flexible display except for the overlap area.

22. The electronic device of claim 18, wherein the electronic device further comprises:

an accelerometer, and wherein the processor is further configured to interface with the accelerometer and perform the displaying comprising:

receiving, from the accelerometer, a reading indicating an upward direction of the electronic device, identifying an orientation of the graphic based on the reading, and displaying, within the display region, the graphic according to the orientation.

23. The electronic device of claim 18, wherein the processor is further configured to perform operations comprising:
    detecting, from the user via the touch-sensitive layer, a gesture, and repositioning the graphic within the display region according to the gesture.

24. A method in an electronic device, the electronic device being rolled with a touchscreen as an outside surface, the method comprising:
    receiving, at the electronic device, an indication of an incoming communication;
    displaying a notification of the incoming communication in a notification area along the outside surface of the touchscreen;
    changing a boundary location of the notification area on the outside surface while displaying the notification in the notification area;
    detecting a tactile interaction by the user via the touchscreen; and
    in response to the detecting the interaction by the user, terminating the displaying of the notification along the outside surface;
    identifying an area of the touchscreen defined by the tactile interaction;
    determining, by a processor based on the area defined by the tactile interaction, a display region on the outside surface of the touchscreen to display a graphic; and
    displaying, within the display region, the graphic.

25. The method of claim 24, wherein the displaying the graphic comprises:
    displaying, within the display region, an interactive panel for the user to respond to an incoming communication.

26. The method of claim 24, wherein the displaying the graphic comprises:
    displaying, within the display region, an input graphic;
    receiving an input from the user; and
    initiating an outgoing communication according to the input.

* * * * *